US010356119B1

(12) United States Patent
Chang

(10) Patent No.: US 10,356,119 B1
(45) Date of Patent: Jul. 16, 2019

(54) DETECTION OF COMPUTER SECURITY THREATS BY MACHINE LEARNING

(71) Applicant: Trend Micro Incorporated, Tokyo (JP)

(72) Inventor: Sheng Che Chang, Taipei (TW)

(73) Assignee: TREND MICRO INCORPORATED, Tokyo (JP)

( * ) Notice: Subject to any disclaimer, the term of this patent is extended or adjusted under 35 U.S.C. 154(b) by 196 days.

(21) Appl. No.: 15/471,883

(22) Filed: Mar. 28, 2017

(51) Int. Cl.
*H04L 29/06* (2006.01)
*G06N 20/00* (2019.01)

(52) U.S. Cl.
CPC ......... *H04L 63/1433* (2013.01); *G06N 20/00* (2019.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,039,702 | B1 * | 5/2006 | Churchyard | H04L 43/18 709/223 |
| 7,203,744 | B1 * | 4/2007 | Parekh | H04L 41/0893 709/223 |
| 7,694,150 | B1 * | 4/2010 | Kirby | G06F 21/55 713/188 |
| 8,205,258 | B1 * | 6/2012 | Chang | G06F 17/30684 709/217 |
| 8,230,262 | B2 | 7/2012 | Li et al. | |
| 8,424,091 | B1 * | 4/2013 | Su | H04L 51/12 713/187 |
| 9,104,864 | B2 * | 8/2015 | Penton | G06F 21/554 |
| 9,225,730 | B1 * | 12/2015 | Brezinski | G06F 21/00 |
| 9,894,085 | B1 * | 2/2018 | Dmitriyev | H04L 63/1416 |
| 2013/0198841 | A1 * | 8/2013 | Poulson | G06F 21/51 726/23 |
| 2013/0219492 | A1 * | 8/2013 | Call | G06F 21/00 726/22 |
| 2016/0277423 | A1 * | 9/2016 | Apostolescu | H04L 63/145 |
| 2016/0337387 | A1 * | 11/2016 | Hu | H04L 63/1425 |
| 2017/0171230 | A1 * | 6/2017 | Leiderfarb | H04L 63/1416 |
| 2018/0181750 | A1 * | 6/2018 | Lamothe-Brassard | G06F 21/552 |

FOREIGN PATENT DOCUMENTS

KR     20080047261 A  *  5/2008

* cited by examiner

*Primary Examiner* — Taghi T Arani
*Assistant Examiner* — Lin Chang
(74) *Attorney, Agent, or Firm* — Okamoto & Benedicto LLP

(57) ABSTRACT

A system for detecting computer security threats includes a machine learning model that has been trained using sequence codes generated from malware process chains that describe malware behavior. An endpoint computer monitors the behavior of a process and constructs a target process chain that describes the monitored behavior. The target process chain includes objects that are linked by computer operations of the monitored behavior. The target process chain is converted to a sequence code that is input to the machine learning model for classification. A response action is performed against one or more objects identified in the target process chain when the machine learning model deems the target process chain as describing malware behavior.

11 Claims, 4 Drawing Sheets

US 10,356,119 B1

DETECTION OF COMPUTER SECURITY THREATS BY MACHINE LEARNING

BACKGROUND OF THE INVENTION

1. Field of the Invention

The present invention relates generally to computer security, and more particularly but not exclusively to methods and systems for detecting computer security threats.

2. Description of the Background Art

A computer security product at an endpoint computer may detect computer security threats by pattern matching. The pattern may include signatures of static features of the threats, such as hashes of malicious code (e.g., Sha1 or Md5 of malicious files and processes), network identifiers (e.g., Internet Protocol (IP) address, Domain Name System (DNS) name) of malicious computers (e.g., malicious websites, command and control (C&C) sites of botnets and dropped malware), etc. One problem with the pattern matching approach is that it is impossible to obtain the signatures of all threats, especially those of particular threats that are yet to be analyzed by computer security experts.

SUMMARY

In one embodiment, a system for detecting computer security threats includes a machine learning model that has been trained using sequence codes generated from malware process chains that describe malware behavior. An endpoint computer monitors the behavior of a process and constructs a target process chain that describes the monitored behavior. The target process chain includes objects that are linked by computer operations of the monitored behavior. The target process chain is converted to a sequence code that is input to the machine learning model for classification. A response action is performed against one or more objects identified in the target process chain when the machine learning model deems the target process chain as describing malware behavior.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
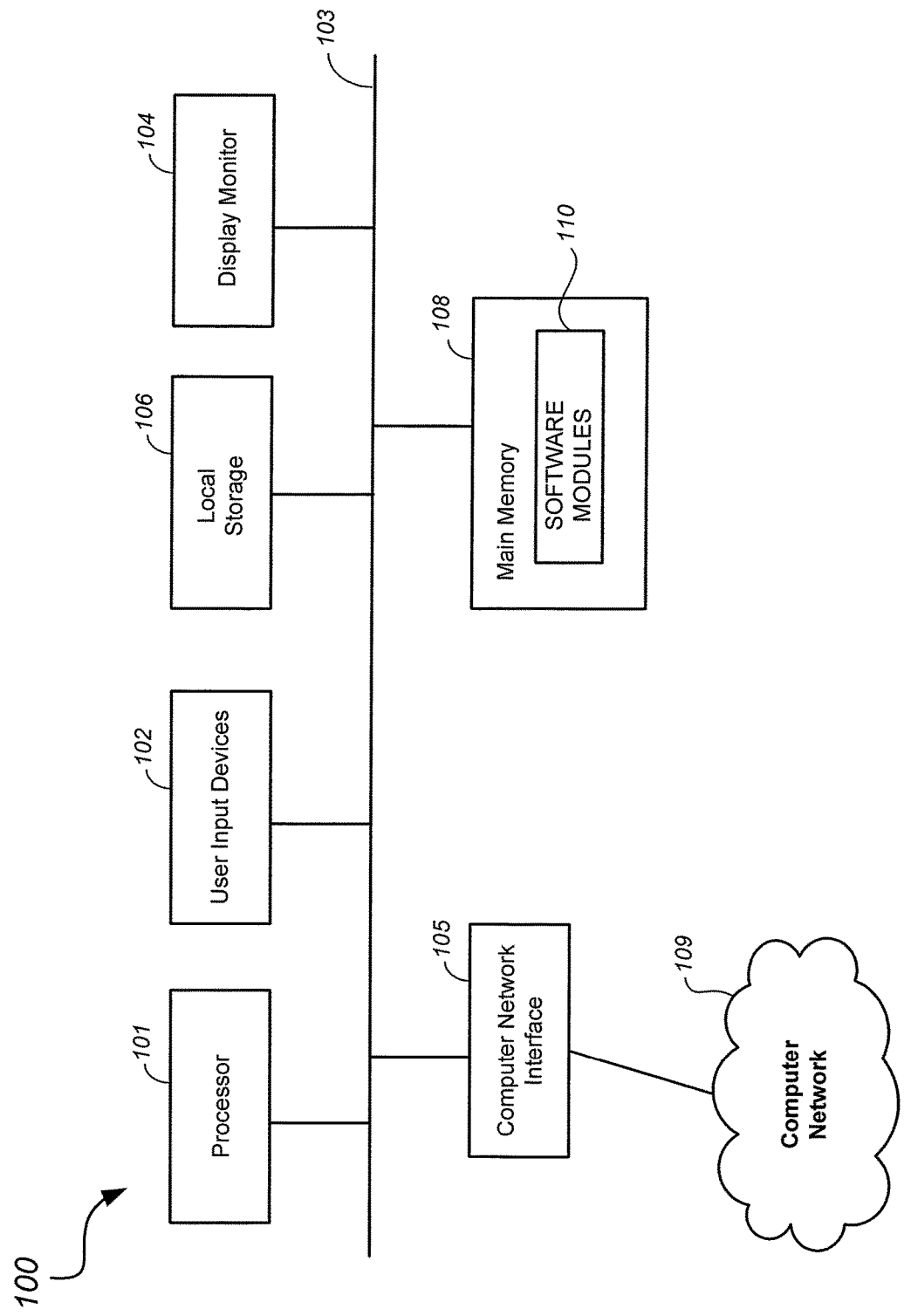
FIG. 1 shows a schematic diagram of a computer that may be configured in accordance with an embodiment of the present invention.

Referring now to FIG. 1, there is shown a schematic diagram of a computer 100 that may be configured in accordance with an embodiment of the present invention. The computer 100 may be configured as an endpoint computer (e.g., FIG. 4, endpoint computer 270) for detecting computer security threats ("threats"), as a machine learning server (e.g., FIG. 4, machine learning server 280) for training and maintaining a machine learning model for evaluating target process chains, and/or as a malware preprocessor (e.g., FIG. 4, malware preprocessor 290) for collecting malware, monitoring behavior of malware, and generating process chains that describe the behavior of malware.

The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more local storage 106, a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with one or more software modules 110, comprising instructions stored non-transitory in the main memory 108 for execution by the processor 101 to cause the computer 100 to perform corresponding programmed steps. An article of manufacture may be embodied as computer-readable storage medium including instructions that when executed by the processor 101 cause the computer 100 to be operable to perform the functions of the software modules 110. The software modules 110 may comprise target processes, a kernel driver, and a threat detector when the computer 100 is configured as an endpoint computer, may comprise a sequence generator and a machine learning model when the computer 100 is configured as a machine learning server, or may comprise a process monitor when the computer 100 is employed as a malware preprocessor.

Figure 2:
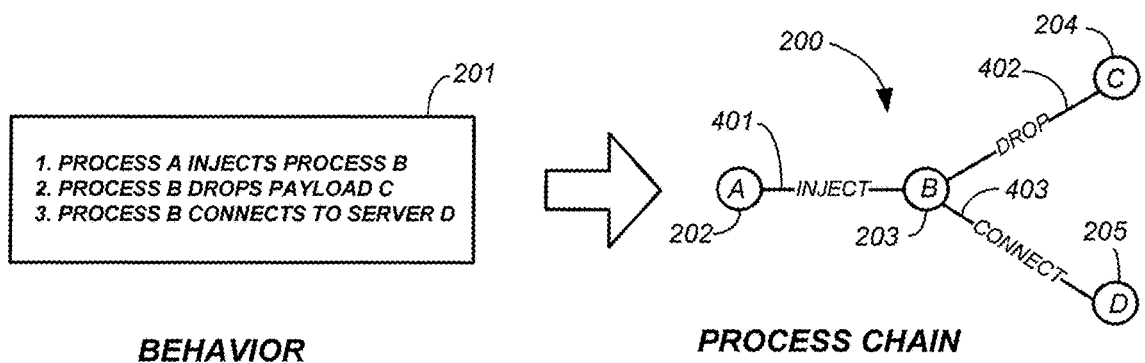
FIG. 2 graphically illustrates generation of a process chain that describes a behavior of a process in accordance with an embodiment of the present invention.

FIG. 2 graphically illustrates generation of a process chain that describes a behavior of a process in accordance with an embodiment of the present invention. The process chain may be a target process chain, i.e., a process chain being evaluated for malware. The process chain may also be a malware process chain, i.e., a process chain of a known malware.

In the example of FIG. 2, a process behavior 201 is converted to a process chain 200, which describes the behavior 201 as a chain of linked objects. In the example of FIG. 2, the process chain 200 has a tree-like structure with four objects, namely objects A (FIG. 2, 202), B (FIG. 2, 203), C (FIG. 2, 204), and D (FIG. 2, 205), with each object being represented by a node in the tree-like structure. An object may be a Named Object that is the actor or target of a computer operation, such as a file, a process, a network address, etc. In one embodiment, a threat event is described as objects that are linked in the process chain 200. A link in the process chain 200 is deemed to have been established (i.e., traversed) when a computer operation described by the link and performed in conjunction with objects connected by the link is detected.

The behavior 201 may pose an unknown computer security threat. The threat is unknown in that it is not a particular known threat that has been analyzed by computer security experts. Unknown threats are particularly difficult to detect because patterns that describe them are generally not available. The behavior 201 may also be that of a known malware, i.e., a known threat, in that the behavior 201 represents computer operations performed by the known malware as evaluated by computer security experts during analysis of the malware.

In the example of FIG. 2, the behavior 201 comprises a series of threat events that each corresponds to a computer operation that malware may perform in an endpoint computer. The behavior 201 may be described by computer security experts based on observed or predicted behavior of the malware. However, the behavior 201 does not necessarily have to be that of a particular known malware. In the example of FIG. 2, the behavior 201 comprises three threat events, namely a process A injects malicious code into a process B (e.g., the Windows operating system service host ("svchost.exe")), the injected process B drops a payload C (e.g., malicious payload), and the injected process B links to a server D (e.g., a C&C site to phone home). The behavior 201 is provided as an example; embodiments of the present invention apply to process behaviors in general.

A threat event is a computer operation that may be performed by malware. Examples of these computer operations include process injection, linking to another computer over a computer network, dropping a payload (e.g., downloading a file), etc. Because a threat event may involve computer operations that are also performed by legitimate programs, a single threat event by itself is not necessarily indicative of presence of malware.

In the example of FIG. 2, the process chain 200 describes the behavior 201 as a series of threat events comprising a first threat event where the object A performs a first computer operation to inject some code into the object B (FIG. 2, link 401), a second threat event where the object B performs a second computer operation to drop the object C (FIG. 2, link 402), and a third threat event where the object B performs a third computer operation to connect to the object D (FIG. 2, link 403). In one embodiment, the initial object that starts the process chain 200 is referred to as the "initial object" and an object that is linked to the initial object or another object is referred to as a "linked object." In the example of FIG. 2, the object A is the initial object and the object B is a linked object that is directly linked to the initial object A, the object C is directly linked to the object B and is indirectly linked to the initial object A, and the object D is directly linked to the object B and is indirectly linked to the object C and the initial object A.

As can be appreciated, the process chain 200 describes the behavior 201 without being limited to particular objects A, B, C, and/or D. That is, the initial object A does not have to be a particular malware that performed the process injection, the object B does not have to be the process of "svchost.exe", etc. The process chain 200 accordingly does not necessarily describe a particular known threat, but also unknown threats. This is particularly advantageous in detecting threats that have been created using malware toolkits.

Commonly-assigned U.S. patent application Ser. No. 15/430,903, filed on Feb. 13, 2017, discloses how to use a process chain (also referred to as "root-cause chain") as a generic pattern for detecting unknown and known computer security threats. In embodiments of the present invention, a process chain provides features that may be employed to train a machine learning model for detecting unknown and known computer security threats.

In one embodiment, a process chain is generated only for newly-created processes that are not white-listed and are launched by particular, predetermined system processes. A process that is white-listed is trusted to be good, e.g., processes that are digitally signed by a trusted source, indicated in a listing of known good processes, etc. The particular system processes for which a process chain is created may include predetermined processes that are known to be exploited by malware. In one embodiment involving the Microsoft Windows™ operating system, the particular system processes include "service.exe", "explorer.exe", and "searchindexer.exe." More particularly, in that embodiment, a process chain is generated only for an initial object that is a newly-created child process of "service.exe", newly-created process launched by "explorer.exe", or user-launched (e.g., by mouse click or enter key) child process of "searchindexer.exe." Limiting the creation of a process chain only for newly-created processes of a particular system process advantageously improves the performance of the threat detection process. After creation of a process chain is initiated by detection of an initial object of particular system process, additional objects may be subsequently directly or indirectly linked to the process chain. Additional objects may be linked to a pre-existing process chain by accumulating threat events in memory.

In one embodiment, objects may be identified and linked based on process ID, process path, and hash of the objects. A linked-list structure describing a process chain does not necessarily include object meta information, such as hash, process path, file path, process name, file name, domain name system (DNS) name, IP address, and/or registry key/name/value. However, object meta information may be stored locally or remotely for reference when newly-creating or linking objects to the process chain.

In one embodiment, a process chain is converted to a sequence code that indicates an action type and layer number of each link that directly connects two objects of the process chain. The action type of a link may indicate the computer operation involving the two objects directly connected by the link, and the layer number may indicate the location of the link relative to the initial object. For example, in the example of FIG. 2, a first layer sequence code may indicate the "inject" operation and a layer number "01" for the link 401 that connects the objects A and B, a second layer sequence code may indicate the "drop" operation and a layer number "02" for the link 402 that connects the objects B and C, and a third layer sequence code may indicate the "connect" operation and a layer number "02" for the link 403 that connects the objects B and D. The sequence code for the process chain 200 in the example of FIG. 2 may be a concatenation of the aforementioned first, second, and third layer sequence codes of the links 401-403, respectively. Generally speaking, a process chain describes a process behavior in linked objects form, whereas a sequence code describes the process behavior in coded form, which advantageously is suitable for training a machine learning model.

Figure 3:
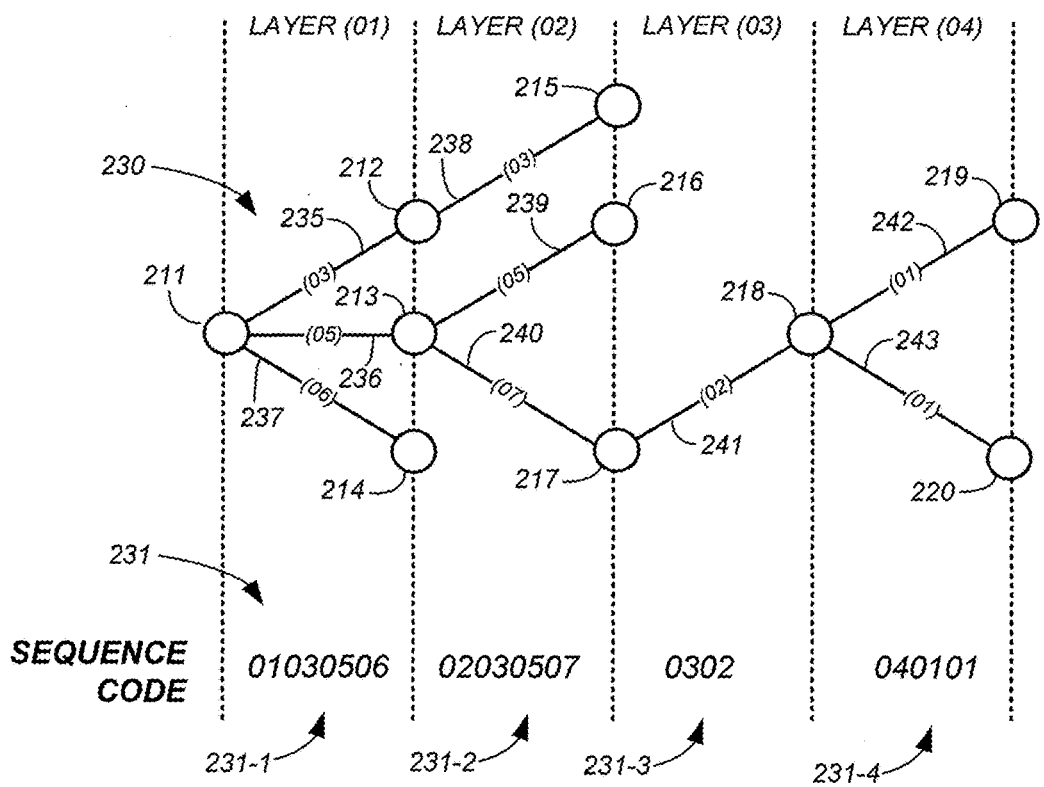
FIG. 3 graphically illustrates conversion of a process chain into a sequence code in accordance with an embodiment of the present invention.

FIG. 3 graphically illustrates conversion of a process chain into a sequence code in accordance with an embodiment of the present invention. In the example of FIG. 3, a process chain 230 comprises objects 211-220. In the example of FIG. 3, the process chain 230 is converted into a sequence code 231 comprising the characters "01030506 02030507 0302 040101." As can be appreciated, a sequence code may be numeric (i.e., numeral characters only), alpha-numeric (i.e., numeral and letter characters), or some other characters. In the example of FIG. 3, the sequence code 231 consists of a layer sequence code 231-1 for a first layer of the process chain 230, a layer sequence code 231-2 for a second layer of the process chain 230, a layer sequence code 231-3 for a third layer of the process chain 230, and a layer sequence code 231-4 for a fourth layer of the process chain 230.

As shown in FIG. 3, a layer number indicates the layer position of the link relative to the initial object in the process chain, which in the example of FIG. 3 is the initial object 211. In the example of FIG. 3, the links 235-237 are assigned a layer number "01", the links 238-240 are assigned a layer number "02", the link 241 is assigned a layer number "03", and the links 242-243 are assigned a layer number "04." Generally speaking, a process chain may have a plurality of layers, which is up to a layer "05" (or higher) in some embodiments. Each of the links 235-237 has a layer number "01" because they directly connect an object to the initial object 211 and are thus on the first layer of the process chain 230, each of the links 238-240 has a layer number "02" because their farthest object relative to the initial object 211 (i.e., objects 215-217) are two links away from the initial object 211 and are thus on the second layer of the process chain 230, the link 241 has a layer number "03" because its farthest object relative to the initial object 211 (i.e., object 218) is three links away from the initial object 211 and is thus on the third layer of the process chain 230, and each of the links 242-243 has a layer number "04" because their farthest object relative to the initial object 211 (i.e., objects 219 and 220) are four links away from the initial object 211 and are thus on the fourth layer of the process chain 230. That is, the link layer numbers "01" through "04" represent the first through fourth layers of the process chain 230.

A layer count represents the length of the process chain. For example, the process chain 230 has a layer count of four (i.e., goes up to layer number "04"), indicating that the process chain 230 is four links deep, i.e., has four layers. As can be appreciated, a process chain may also have five or more layers. In one embodiment, the layer numbers are ordered with implicit time sequence. That is, a link on a lower layer occurs before a link on a higher layer on the same path on the process chain. For example, the link 235 (layer number "01") occurs before the link 238 (layer number "02"), the link 241 (layer number "03") occurs before the link 242 (layer number "04") and before the link 243 (layer number "04"), etc.

In one embodiment, a link is assigned an action type that identifies the computer operation involving the objects connected by the link. In one embodiment, there are ten pre-defined action types for process, file, network, and registry operations for computers running the Microsoft Windows™ operating system. The ten pre-defined action types in that embodiment consist of Create, Createby, Inject, Injectedby, Open, Drop, Launch, Query, Connect, and Set computer operations. Each of the pre-defined action types may be assigned an action type number, such as "01" to "10". For example, a Create operation may be assigned an action type "01", a Createby operation may be assigned an action type "02", an Inject operation may be assigned an action type "03", etc. in the example of FIG. 3, each of the links 235-243 is assigned one of the action types 01-10. For example, the link 235 is assigned an action type "03" (e.g., an inject operation) that indicates the computer operation involving the initial object 211 and the object 212.

In the example of FIG. 3, each of the layers of the process chain 230 is assigned a layer sequence code that indicates the layer number of the links and the action type of each of the links in the layer. The layer sequence codes of all layers of the process chain 230 may be concatenated together to form the overall sequence code 231 of the process chain 230. In the example of FIG. 3, the layer sequence code 231-1 is "01030506", with the first two digits of the layer sequence code (i.e., "01xxxxxx") indicating the layer number, and the following digits indicating the action type of each link on the layer number "01". More particularly, for layer "01", the next following two digits (i.e., "xx03xxxx") indicate the action type of the link 235, the next following two digits (i.e., "xxxx05xx") indicate the action type of the link 236, and the next following two digits (i.e., "xxxxxx06") indicate the action type of the link 237. The same procedure may be performed to generate the layer sequence codes 231-2, 231-3, and 231-4 for the layer numbers "02", "03", and "04", respectively. All the layer sequence codes of the process chain 230 may be concatenated together to form the overall sequence code 231 of the process chain 230. The layer sequence codes may be directly concatenated together in the sequence code 231, or separated by a delimeter (e.g., space, hyphen, etc.) in the sequence code 231.

Figure 4:
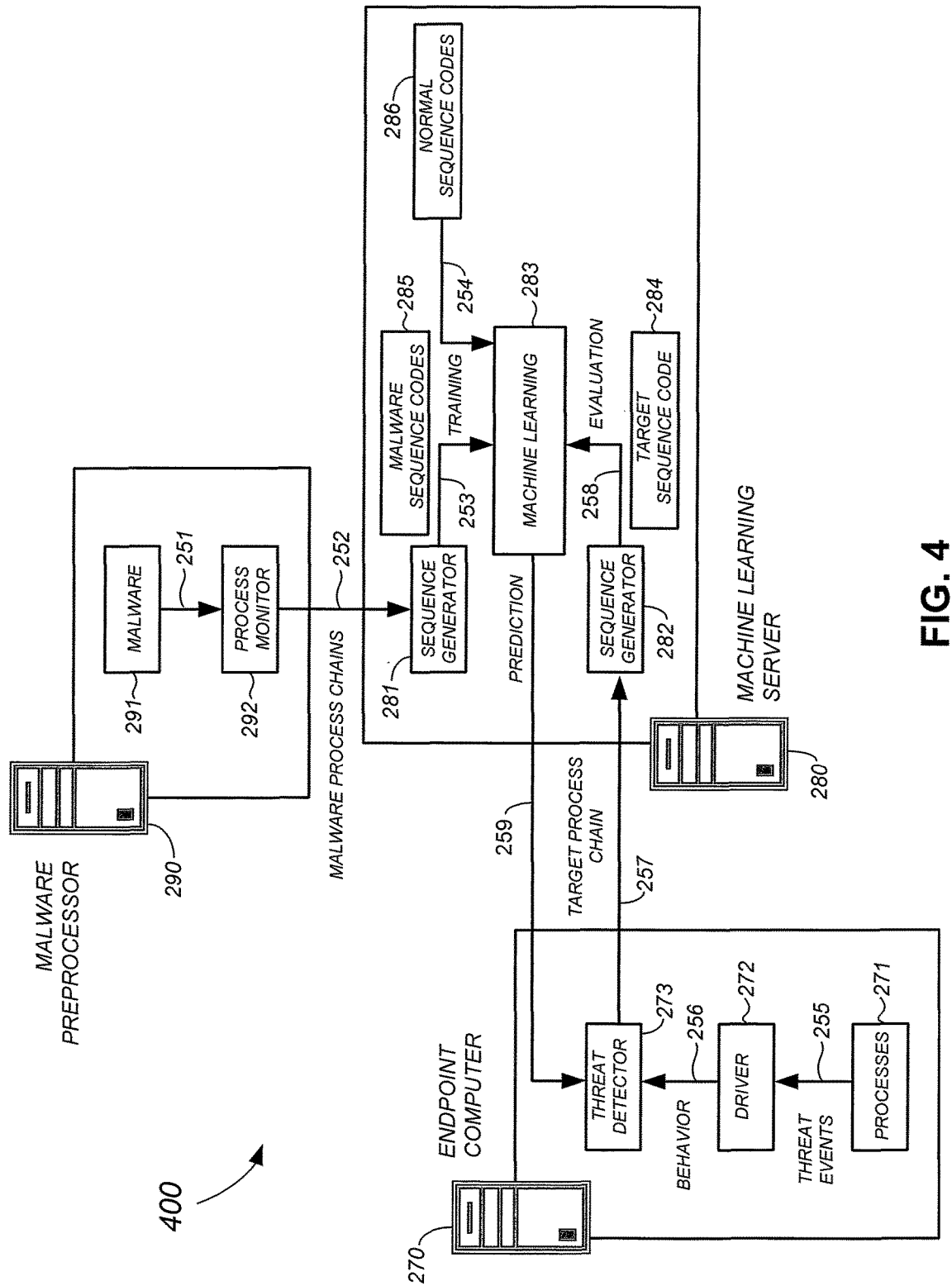
FIG. 4 schematically shows a system for detecting computer security threats in accordance with an embodiment of the present invention.

FIG. 4 schematically shows a system 400 for detecting computer security threats in accordance with an embodiment of the present invention. In the example of FIG. 4, the system 400 comprises an endpoint computer 270, a machine learning server 280, and a malware preprocessor 290. The endpoint computer 270, machine learning server 280, and the malware preprocessor 290 may communicate over a computer network, which may include the Internet. As can be appreciated, the functionality of the endpoint computer 270, the machine learning server 280, and the malware preprocessor 290 may be provided by separate computers as in FIG. 4, or combined into one or more computers.

The malware preprocessor 290 may comprise a computer that is configured to receive samples of malware, monitor the behavior of the malware during execution of the malware, and generate a process chain that describes the behavior of the malware. The malware preprocessor 290 may be configured as a honeypot to attract malware in the wild. The malware preprocessor 290 may also be configured to receive submissions of malware samples from computer security researchers, antivirus products customers, and other trusted sources. The malware preprocessor 290 may include a process monitor 292 that is configured to provide a controlled environment where a malware 291 may be safely executed for observation. The malware process monitor 290 may comprise a virtual machine sandbox, for example. The process monitor 292 may monitor the behavior of the malware 291 during execution of the malware 291 (see arrow 251). The process monitor 292 may be configured to detect and record the observed behavior of the malware 291, and convert the observed behavior of the malware 291 into a malware process chain that describes the observed malware behavior. The process monitor 292 may generate a plurality of malware process chains, one for each particular malware, and provide the malware process chains to the machine learning server 280 (see arrow 252).

The machine learning server 280 may comprise a computer that is configured to train a machine learning model 283 to classify a target process chain to determine whether a target process chain describes malware behavior. In one embodiment, the machine learning server 280 includes a sequence generator 281 that is configured to convert malware process chains received from the malware preprocessor 290 into malware sequence codes 285. In one embodiment, the malware sequence codes 285 are labeled as "malware", and the labeled malware sequence codes 285 are employed as malware training data set to train the machine learning model 283 to detect malware sequence codes (see arrow 253). Normal (i.e., non-malicious/legitimate) sequence codes 286 generated from normal process chains that describe normal process behaviors may also be labeled as "normal", and the labeled normal sequence codes 286 are employed as normal training data set to train the machine learning model 283 to detect normal sequence codes (see arrow 254).

In one embodiment, the malware sequence codes 285 and the normal sequence codes 286 are labeled per layer sequence code. For example, when the process chain 230 (shown in FIG. 3) describes the behavior of a known malware, each of the layer sequence codes 231-1, 231-2, 231-3, and 231-4 is labeled as malware for machine learning training purposes. Similarly, each of the layer sequence codes 231-1, 231-2, 231-3, and 231-4 is labeled as normal for machine learning training purposes when the process chain 230 describes a behavior of a normal process. The machine learning model 283 may be generated using a suitable machine learning algorithm, such as Support Vector Machine (SVM). Other machine learning algorithms may also be employed without detracting from the merit of the present invention.

An endpoint computer 270 may comprise a computer that is configured to execute processes 271 and monitor the behavior of the processes 271 during execution to determine if any of the processes 271 is malware. The endpoint computer 270 is so named because it is the computer where detection of threats is performed. The endpoint computer 270 may include a driver 272 for detecting threat events performed or initiated by the processes 271 (see arrow 255). The driver 272 reports the detected threat events to a threat detector 273 (see arrow 256), thereby enabling the threat detector 273 to monitor the behavior of the processes 271.

The driver 272 may comprise a kernel driver and a user mode hooking driver. The driver 272 may be configured to detect threat events, such as kernel events and network events, and provide the threat detector 273 raw event data comprising information on the detected threat events. The raw event data received by the threat detector 273 from the driver 272 may identify the objects involved in the event (also referred to as "who" information), the computer operation involving the objects (also referred to as "what" information), and location involved (also referred to as "where information").

The "who" information of the raw event data may indicate subject process and child process information (such as process ID, process path, and process hash) and file information, if available. The "what" information of the raw event data may indicate the action type of the computer operation, such as create, inject, drop, query, connect, set activity, etc. The "where" information of the raw event data may indicate a network address, DNS name, IP address, registry information, etc. The threat detector 273 may employ the raw event data to create a new process chain or to link objects to an existing process chain.

For each threat event, the threat detector 273 may create a new process chain or link the objects of the threat event to an existing process chain. In one embodiment, the threat detector 273 creates a new process chain only for a child process whose subject or parent process is one of a plurality of pre-defined system processes, which in one embodiment involving the Microsoft Windows™ operating system consist of the processes "service.exe", "explorer.exe", and "searchindexer.exe." In that embodiment, the initial object of the newly created process chain is the child process of the particular, pre-defined system process.

For each threat event, the threat detector 273 may also link or concatenate new objects to an existing (i.e., previously created) process chain. The threat detector 273 may link an object to an existing process chain based on the who information of the objects. For example, the threat detector 273 may link a subject process indicated in a raw event data to a child process indicated in a process chain when the subject and child processes have the same attributes (e.g., same process ID, path, and hash), thereby indicating that the subject process and the child process are the same process. This allows the other object involved with the subject process to be concatenated to the process chain. The procedure of linking objects to an existing process chain is further illustrated with reference to FIG. 5 using the process chain 200 (shown also in FIG. 2) as an example.

Figure 5:
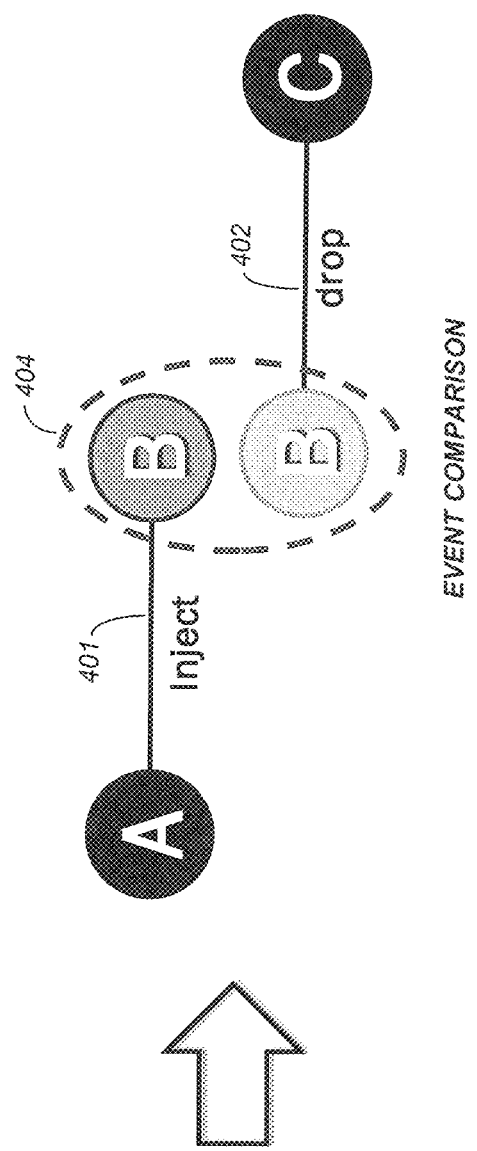
FIG. 5 graphically illustrates linking an object to an existing process chain in accordance with an embodiment of the present invention.
Figure 5:
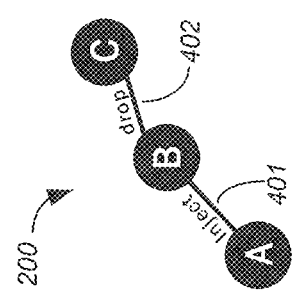

FIG. 5 shows a graphical illustration of linking an object to an existing process chain in accordance with an embodiment of the present invention. In the example of FIG. 5, the link 401 describes a threat event where a computer operation links the initial object A to the object B, and a link 402 describes a threat event where a computer operation links the object B to the object C. In the example of FIG. 5, the threat event of the link 401 is a computer operation where a process (object A) injects code into another process (object B), and the threat event of the link 402 is a computer operation where the injected process (object B) drops a payload (object C). When the computer operation of the link 401 is detected, e.g., a child process of a pre-defined system process injects another process with code (e.g., malicious code), the threat detector 273 creates a new process chain. Thereafter, when the computer operation of the link 402 is detected, e.g., the injected process dropped a payload (e.g., executable file), the threat detector 273 performs an event comparison (see 404) to determine whether the object B in the threat event described by the link 401 of the existing process chain is the same as the object B in the threat event described by the link 402. That is, the event comparison determines whether or not the process that has been injected with code in the initial threat event is the same process that has dropped a payload in the subsequent threat event. If so, the link 401 and the link 402 have been established and the process chain is accordingly updated to link the object C to the object B.

Continuing with the example of FIG. 4, the threat detector 273 may continue building a process chain up to a particular layer count, which may be four layers in embodiments where the sequence codes are four layers deep. After the process chain has the requisite layer count, the process chain is provided to the machine learning server 280 for evaluation (see arrow 257). A process chain being evaluated for computer security threats is also referred to herein as the "target process chain."

In the example of FIG. 4, the machine learning server 280 includes a sequence generator 282 that is configured to convert a target process chain into a target sequence code 284. The sequence generators 281 and 282 may employ the same algorithm to convert a process chain into a sequence code. The target sequence code 284 is input to the machine learning model 283 to be classified (see arrow 258). In one embodiment, the machine learning model 283 classifies the target sequence code 284 as a malicious sequence code or a normal sequence code. The result of the classification is also referred to as a prediction, as it predicts whether or not the target sequence code 284 describes a malicious behavior based on the training data set employed to train the machine learning model 283. The prediction is sent to the threat detector 273 (see arrow 259).

The threat detector 273 may perform a response action when the target process chain is deemed to be a malicious process chain. More particularly, when the prediction indicates that the target process chain describes malware behavior, the initial object and other objects of the target process chain may be deemed to be malware. In that case, the threat detector 273 may perform a response action, such as putting the malware in quarantine, blocking the malware from execution, alerting the administrator or another computer of the presence of the computer security threat, etc. The disclosed threat detection process and system advantageously improve the operation of the endpoint computer 270 and other computers on the network by detecting and performing remedial actions against computer security threats, which can cause computers to slow down, destroy data, steal confidential information, hijack the computers, etc.

Systems and methods for detecting computer security threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting computer security threats, the method comprising:
generating a malware process chain that describes a behavior of a known malware, the malware process chain comprising objects that are connected by links, each of the links in the malware process chain representing a computer operation performed by two adjacent objects in the malware process chain;
converting the malware process chain into a malware sequence code, the malware sequence code comprising a coded representation of pre-defined action types that identify computer operations represented by the links in the malware process chain and layer positions of the links in the malware process chain, the malware sequence code comprising a plurality of layer sequence codes, each of the layer sequence codes comprising a layer number that is a numerical indicator of a position of a set of links on a same layer relative to an initial object in the malware process chain and comprising action types of the set of links on the same layer;
training a machine learning model with a training data set comprising the malware sequence code;
using the machine learning model to determine whether a target process chain describes malware behavior, the target process chain comprising objects that are connected by links, each of the links in the target process chain representing a computer operation performed by adjacent objects in the target process chain; and
performing a response action to protect a computer when the machine learning model classifies the target process chain as describing the malware behavior.

2. The method of claim 1, wherein using the machine learning model to determine whether the target process chain describes the malware behavior comprises:
detecting a first computer operation performed by a first object with a second object;
creating the target process chain comprising the first object, the second object, and a first link representing the first computer operation;
detecting a second computer operation performed by the second object with a third object; and
in response to detecting the second computer operation, updating the target process chain by linking the third object to the second object in the target process chain.

3. The method of claim 2, wherein updating the target process chain by linking the third object to the second object in the target process chain comprises:
determining that the second object is the same object in the first and second computer operations.

4. The method of claim 1, wherein an initial object in the target process chain is a first process running in an endpoint computer and the response action includes blocking the first process from being executed.

5. The method of claim 1, wherein an initial object in the target process chain is a second process running in an endpoint computer and the response action includes putting the second process in quarantine.

6. The method of claim 1, wherein using the machine learning model to determine whether the target process chain describes the malware behavior comprises:
converting the target process chain into a target sequence code, the target sequence code comprising a coded representation of pre-defined action types that identify computer operations represented as links in the target process chain and layer positions of the links in the target process chain; and
providing the target sequence code as input to the machine learning model.

7. The method of claim 6, further comprising:
transmitting, by an endpoint computer, the target process chain to a machine learning server that hosts the machine learning model over a computer network.

8. A system for detecting computer security threats, the system comprising:
an endpoint computer that is configured to detect a first computer operation performed by a first object with a second object, to create a target process chain comprising the first object, the second object, and a first link representing the first computer operation, to detect a second computer operation performed by the second object with a third object, to update the target process chain by linking the third object to the second object in the target process chain in response to detecting the second computer operation, and to transmit the target process chain over a computer network for evaluation; and
a machine learning server comprising a computer that is configured to host a machine learning model, to receive the target process chain over the computer network, to consult the machine learning model to classify the target process chain to determine whether the target process chain describes a malware behavior, and to inform the endpoint computer whether or not the target process chain describes the malware behavior,
wherein the machine learning model hosted by the machine learning server is trained using a malware sequence code that describes the malware behavior, the malware sequence code being generated from a malware process chain that describes the malware behavior, the malware process chain comprising objects that are connected by links that represent computer operations between the objects in the malware process chain, the malware sequence code comprising a coded representation of pre-defined action types that identify computer operations represented by the links in the malware process chain and layer position of the links in the malware process chain, the malware sequence code comprising a plurality of layer sequence codes, each of the layer sequence codes comprising a layer number that is a numerical indicator of a position of a set of links on a same layer relative to an initial object in the malware process chain and comprising action types of the set of links on the same layer.

9. The system of claim 8, wherein the endpoint computer is configured to, in response to the machine learning model classifying the target process chain as describing the malware behavior, perform a response action to protect the endpoint computer.

10. The system of claim 9, wherein an initial object of the target process chain is a first malware process and the endpoint computer is configured to block the first malware process from executing in the endpoint computer.

11. The system of claim 9, wherein an initial object of the target process chain is a second malware process and the endpoint computer is configured to quarantine the second malware process.

* * * * *